United States Patent [19]

Seneau

[11] Patent Number: 4,861,601
[45] Date of Patent: * Aug. 29, 1989

[54] PREPROOFED, PARTIALLY-BAKED AND FROZEN, CRUSTY BREAD AND METHOD OF MAKING SAME

[75] Inventor: Bernard Seneau, Woodbridge, Conn.

[73] Assignee: General Foods Corporation, White Plains, N.Y.

[*] Notice: The portion of the term of this patent subsequent to Nov. 29, 2005 has been disclaimed.

[21] Appl. No.: 229,368

[22] Filed: Aug. 5, 1988

Related U.S. Application Data

[63] Continuation-in-part of Ser. No. 65,821, Jun. 23, 1987, Pat. No. 4,788,067.

[51] Int. Cl.$^4$ .................. A21D 10/02; A21D 15/02; A23L 3/36
[52] U.S. Cl. ................................ 426/19; 426/496; 426/498; 426/524
[58] Field of Search ................ 426/496, 19, 498, 524

[56] References Cited

U.S. PATENT DOCUMENTS

| | | | |
|---|---|---|---|
| 1,169,023 | 1/1916 | Embrey | 426/496 |
| 1,224,492 | 5/1917 | Narobe | 426/496 |
| 2,204,045 | 6/1940 | Meacham | 426/496 |
| 2,549,595 | 4/1951 | Gregor | 426/19 |
| 2,767,667 | 10/1956 | Spooner | 426/496 |
| 4,788,067 | 9/1988 | Seneau | 426/19 |

FOREIGN PATENT DOCUMENTS 2446581  4/1976  Fed. Rep. of Germany ...... 426/496

OTHER PUBLICATIONS

Tressler et al. vol. 1, 1968, The Freezing Preservation of Foods, Avi. Publishing Co., pp. 120-129.

*Primary Examiner*—Donald E. Czaja
*Assistant Examiner*—Helen Pratt
*Attorney, Agent, or Firm*—Thomas R. Savoie; Daniel J. Donovan

[57] ABSTRACT

A preproofed, and partially-baked crusty bread which is frozen for later completion of baking and a method of manufacturing the same. When desired to be served, the end user merely takes the product out of the freezer and places the same in the oven for completion of baking. After baking is completed, the freshness of the product is retained for up to about 24 hours. A critical aspect of the method of manufacturing the product is a first and a second injection of steam into the oven during partial baking of the product, this provides the end user with a completely sealed crusty bakery product that will not have the crust separated from the loaf. The second injection of steam provides the product with about 20% or greater of moisture of a fully-baked product.

13 Claims, No Drawings

PREPROOFED, PARTIALLY-BAKED AND FROZEN, CRUSTY BREAD AND METHOD OF MAKING SAME

BACKGROUND OF THE INVENTION

This application is a continuation-in-part of Ser. No. 65,821 filed June 23, 1987 now U.S. Pat. No. 4,788,067.

The present invention relates to a crusty or specialty type bread product and the method of manufacturing the same. A crusty or specialty bread product is exemplified by the traditional French bread, i.e., a bread being rather doughy on the inside, yet light, and having a harder crust on the outside. It is a principal thrust of the invention disclosed herein to provide a specialty or crusty bread to the end user which can be at least in part baked on the end user's premises. This provides the end user with a delicious product which he feels was "baked on the premises" and, in addition, it provides a sense of the freshly baked aroma of bread. It is a significant advance over merely reheated breads which have already been fully baked and then frozen.

Neighborhood bakeries, supermarket in-store bakeries, and specialty and gourmet shops are seeking to appeal to end users with a fresh baked line of authentic French and other hard crusted breads. The method disclosed herein only requires about 10 to 15 minutes to "finish off" the bread by baking the already partially-baked dough in any type of oven, whether it is a domestic oven, a convection oven, a semi-industrial oven, etc., but not, however, a microwave oven.

Independent of whether the product is placed into the finishing oven in a fully frozen state, a thawed and then refrigerated state or a thawed and stored at room temperature state, upon finish baking, the result is a spectacular, fresh-baked product that retains its freshness for up to about 24 hours. Unlike products advertised as "brown and serve," the bread product produced hereby has been fully proofed, cut, steamed and partially-baked in ovens where the humidity has been precisely controlled.

DESCRIPTION OF THE PRIOR ART

There exists, of course, in the prior art, fully baked and then frozen breads which are sold in the frozen state to the end user or consumer. When the end user desires to serve this product, he or she removes the same from the freezer and merely reheats it. This, however, does not provide the end user with a sense of "freshly baking it on the premises" nor does it really provide the aroma of a freshly baked bread product and, further, it does not form a crust that will stay on the loaf. Furthermore, this type of product does not have the freshness of truly fresh baked bread products.

The invention disclosed herein is intended to provide to the end user a fresh baked authentic French or other hard crusted bread which requires a minimum of time and effort and, yet, provides a delicious, apparently freshly baked product, a sense of accomplishment of baking the same on the premises, the aroma of a fresh baked bread, and a freshness and authenticity which far exceeds currently-available, fully-baked and then frozen-for-later reheating or browning bread products.

Fully-baked and then frozen breads which are already commercially available suffer from the following disadvantages, inter alia, with respect to the partially-baked bread product disclosed and claimed herein: the freshness of the finished product, after completion of baking, is far longer than already fully baked products; and, there is no separation of the crust from the inside dough during finish baking with the partially-baked bread product disclosed herein. In previously available hard crust products which are meant to be served long after baking, there is a separation between the hard crust and the inside dough. The present invention, on the other hand, exhibits no such bread dough to hard crust separation. When stored at about 0° F. (−17.8° C.), the partially-baked bread product of this invention has a shelf life of about 5 to 6 months. The shelf-life of the partially-baked bread, when thawed and stored in a refrigerator is about eight days, and the shelf life of the product when thawed and left at about room temperature is about 48 hours. All of these represent improved shelf life with respect to previously available hard crusty or specialty bread.

Also, according to the present invention, the freshness, which usually corresponds to the amount of $CO_2$ and water or humidity retained in the product, is also far improved over the previously available products.

SUMMARY OF THE INVENTION

The present invention relates to a crusty or specialty bread and a method of manufacturing the same which has an improved shelf life and is finished baked on the site of the ultimate end user. The moisture content of the partially-baked product is at least about 20% greater than the moisture content of a fully-baked and then frozen product and this, too, is a tremendous advantage to the present product. Basically, as will be explained more fully hereinafter, the bread is prepared by mixing dry ingredients with water and a leavening agent, preferably yeast. A taste enhancing ingredient, such as salt, is preferably added. Preferably, the temperature of the ingredients is adjusted so that the temperature of the dough is about 78° F. (25.6° C.) after the mixing process is completed. Next, the dough is rested to let the fermentation start. This is typically done at about an ambient humidity and temperature for about 10 minutes.

Next, the dough is divided, weighed, lightly rounded, and then left to rest for a second rising. It is then flattened to expel carbon dioxide. The dough is then molded into the dough's final form and left to rest in a proofing atmosphere for a final rising.

The dough is proofed at a relative humidity which is preferably between about 65 and 75% and at a temperature of from about 80° to 85° F. (26.7° to 29.4° C.). Of course, lower humidity and/or temperature could be employed if extended proofing times were tolerable. The proofing step should be effective to obtain a proofed dough volume of from 2.0 to 3.0, preferably about 2.5, times the preproofed dough volume.

Next, the dough is baked. This is done by placing the proofed dough in an oven which has been preheated to about 350° to 400° F. (176.7° to 204.4° C.), according to the size of the loaves. The oven is then injected with a jet of steam in order to keep the skin of the dough plastic, which condition will contribute to the volume of the bread and accentuate the definition of any slash marks on the top of the loaf. Then, the dough is baked to achieve a 78 to 90%, preferable about an 84%, prebaked product. The length of baking time will, of course, depend on the size and shape of the dough. Before the completed baking time, however, the oven is given a second jet of steam, thus allowing the partially-baked product to retain a substantial amount of moisture, which is at least about 20% more than a fully baked product.

The bread is then cooled for a period of at least about 15 minutes, depending on size. Then, the bread is frozen, again for a time depending on the size of the loaves. Finally, the product is packaged and stored at 0° F.

DETAILED DESCRIPTION OF THE INVENTION AND THE PREFERRED EMBODIMENT

The purpose of the method of the invention disclosed herein is to enable neighborhood bakeries, supermarket in-store bakeries, and specialty and gourmet shops to offer the end user or consumer a fresh baked line of authentic French and other hard crusted breads. The purpose of the present invention is accomplished while maintaining the freshness and authenticity of the product both before final baking and after the final baking. The method only requires about 10 to 15 minutes to "finish off" the bread by baking the partially-baked bread in any type of commercial or even residential oven, as, for example, convection, semi-industrial, domestic, etc. (not a microwave, however). Also of importance, the present invention does not require the use of specially skilled labor to provide the desired product.

At a temperature of about 350° to 375° F. (176.7° to 190.6° C.) the processed and partially-baked bread may be baked to a finished product either from a frozen or a thawed state. Irrespective of the state that the partially-baked product is in when it is sought to be "finished off", the result is a spectacular, fresh baked product that retains its freshness for up to 24 hours. Unlike products advertised as "brown and serve", the bread product produced herein has been fully proofed under controlled conditions, has been cut, steamed and precisely pre-baked to only about 78 to 90% of a finished baked product in properly humidity-controlled, steam-providing ovens. In this manner the ultimate finisher of the product is doing the baking to a finished edible product and the freshness is superior. The presence of a freshly baked aroma is also significant.

A commercial batch of the product is prepared with 100 pounds of flour constituting the base. The particular composition of one embodiment of the flour is 75 pounds of patent flour, representing an 75% base flour and 25 pounds of pastry flour, representing 25% flour. The percentages just described add up to a total of 100% or 100 pounds of the flour composition. As is usual in commercial baking, the other ingredients are based on percentages of the total flour which percentages are easily converted into pounds. The flour is first dry mixed to form the flour composition. Then about 57 to 60 pounds of water, as the hydration agent, is added to the dry mixture along with about 1.8 pounds of yeast representing 1.8 percent leavening agent, 1.5 pounds of salt, representing the 1.5% taste or flavor enhancer, and 0.75 pounds of dough conditioner.

The dry ingredients, except the salt, along with the water are mixed in a conventional manner to produce a homogeneous dough composition. Mixing takes about 14 minutes. Then salt is added for the last 4 minutes of mixing. The temperature of the ingredients, along with a consideration of the ambient temperature, is adjusted so that the dough composition, after mixing, is at a temperature of about 78° F.

Now, the dough is rested for about 10 minutes in order to allow the fermentation to commence and this is done in at ambient temperature, typically about 80° to 85° F. (26.7° to 29.4° F.).

Once the dough has risen for the first time it is then divided, weighed, lightly rounded, and then left to rest for a second rising for a period of time, typically varying from between about 12 to 18 minutes. It is then flattened, molded into the dough's final form and then left to rest in a proofing atmosphere for the final rising until it reaches the desired density.

In the proofing stage, the humidity will usually range between about 65% and about 80% and the temperature will usually range between about 80° to 85° F., (26.7° to 29.4° C.). This readily brings the dough to a final pre-baked density, having a volume of from 2.0 to 3.0, preferably 2.5, times the preproofed volume.

The dough is now ready for near complete baking. The dough is placed in a preheated oven at a temperature of about 350° to 400° F. (176.7° to 204.4° C.) according to the size of the loaves. During the initial stages of baking a first stream of low-pressure, saturated steam is injected into the oven, preferably this period of steam injection lasts for at least 30 seconds. It has been found that this initial steam maintains the skin of the dough in a plastic condition while the dough is expanding in the oven (i.e. undergoes oven spring).

The initial flow of steam is interrupted and baking of the dough continues to obtain a total period of at least 10 minutes, usually about 12 to 25 minutes; the exact time depending upon the size and shape of the dough. During the latter stage of baking a second stream of low-pressure, saturated steam is injected into the oven. Typically, this second stream is injected for a period of at least 20 seconds. Typically, the second steam injection step begins about three minutes before the end of the baking cycle. Thereafter, the dough is removed from the oven after only 78 to 90%, preferably about 84%, of the time required to obtain a fully-baked bread. The second stream of injection and the total baking time is selected to obtain a moisture content in the partially-baked bread which is at least about 20% greater than the moisture content of a fully-baked bread.

The partially-baked bread is removed from the oven and cooled to about ambient temperature. Cooling will, depending on the size of the bread, usually take about 15 to 45 minutes. The cooled bread is then quickly frozen to below 0° F. (−17.7° C.) using freezing equipment such as a flash and/or blast freezer. It has been found that a distinct cooling step is necessary in order to uniformly distribute moisture between the crust and the interior of the bread and to create elasticity in the crust. The cooled, partially-baked bread of this invention possesses resistance to freezer distortion and the resulting frozen product can be fully baked after extended frozen storage without encountering crust deformation or separation between the crust and the internal crumb.

Finally, the thoroughly frozen product is packaged in a suitable wrapper (e.g. plastic film) for storage at about 0° F.

One of the truly unique aspects of the processing is the last injection of steam before the end of the baking period. This enables the end-user to have a product with a completely sealed crust that will not separate from the loaf. Undesirable separation can be observed in many of the so-called "brown and serve" products.

It will be appreciated that the particular description of the embodiments disclosed herein are only representative of the invention. Skilled bakers will, basis the disclosure set forth above, be readily able to adjust formulations and processing conditions to practice my invention in accordance with their own particular needs. The true scope of the invention to which I am entitled to is shown by the claims and their legal equivalents.

I claim:

1. A method of producing a frozen, partially-baked, proofed, crusty bread product having improved storage stability, with respect to quality of the fully-baked bread product, in the frozen state, in the thawed and refrigerated state, and in the thawed and ambient state comprising the steps of:
   (a) forming a bread dough comprised of water, flour, yeast, and salt;
   (b) allowing the dough to ferment and rise;
   (c) dividing and molding the fermented dough;
   (d) proofing the molded dough in a high humidity atmosphere for a period of time effective to obtain a proofed volume of from 2.0 to 3.0 times the pre-proofed volume;
   (e) placing the proofed dough of step (d) in a pre-heated oven;
   (f) injecting a first stream of low-pressure, saturated steam into the oven during the initial stages of baking in order to keep the skin of the dough plastic while the dough is expanding in the oven;
   (g) interrupting the flow of steam and continuing to bake the dough for at least ten minutes, thereafter;
   (h) injecting a second stream of low-pressure, saturated steam during the latter stages of baking and removing a partially baked bread from the oven, said second stream of injected steam and the total baking period being effective to produce a moisture content in said partially-baked bread which is at least about 20% by weight greater than the moisture content of a fully-baked bread;
   (i) cooling the partially-baked bread to about ambient temperature; and thereafter
   (j) quickly freezing the cooled bread of step (i) to a temperature of below 0° F.

2. The method of claim 1 wherein the first stream of steam is injected into the oven for at least 30 seconds.

3. The method of claim 2 wherein the second stream of steam is injected into the oven for at least 20 seconds.

4. The method of claim 3 wherein the dough is baked at from 350° F. to 400° F. for from 12 to 25 minutes.

5. The method of claim 3 wherein the partially-baked bread is removed from the oven after only 70 to 90% of the time required to obtain a fully-baked bread.

6. The method of claim 3 wherein the dough is baked for about 84% of the time required for a fully-baked bread.

7. The method of claim 1 wherein the temperature of the dough after mixing is about 78° F.

8. The method of claim 1 wherein the proofed volume of the dough is about 2.5 times the unproofed volume.

9. The method of claim 1 wherein the dough contains only water, flour, yeast, salt and dough conditioners.

10. The method of claim 9 wherein the dough contains 100 parts flour and about, 57 to 60 parts water.

11. The method of claim 1 wherein the second steam injection step begins about three minutes before the end of the baking cycle.

12. The method of claim 1 wherein the partially-baked bread is cooled for from 15 to 45 minutes.

13. A proofed, partially-baked and frozen crusty bread product produced in accordance with claim 1.

* * * * *